(12) United States Patent
Ishibashi et al.

(10) Patent No.: US 10,604,159 B2
(45) Date of Patent: Mar. 31, 2020

(54) DISPLAY DEVICE

(71) Applicant: TOYOTA JIDOSHA KABUSHIKI KAISHA, Toyota-shi, Aichi-ken (JP)

(72) Inventors: Masahisa Ishibashi, Nisshin (JP); Yasutaka Yoshimura, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/425,133

(22) Filed: Feb. 6, 2017

(65) Prior Publication Data

US 2017/0274910 A1  Sep. 28, 2017

(30) Foreign Application Priority Data

Mar. 22, 2016  (JP) .................................. 2016-057328

(51) Int. Cl.
| | | |
|---|---|---|
| *B60W 50/14* | (2020.01) |
| *B60K 6/445* | (2007.10) |
| *B60K 6/48* | (2007.10) |
| *B60W 20/40* | (2016.01) |

(52) U.S. Cl.
CPC .............. *B60W 50/14* (2013.01); *B60K 6/445* (2013.01); *B60K 6/48* (2013.01); *B60W 20/40* (2013.01); *B60W 2050/146* (2013.01); *B60W 2710/244* (2013.01); *B60Y 2200/92* (2013.01); *Y02T 10/6239* (2013.01); *Y10S 903/903* (2013.01)

(58) Field of Classification Search
CPC ................. B60W 50/14; B60W 20/40; B60W 2050/146; B60W 2710/244; B60K 6/48; B60Y 2200/92; Y10S 903/903
See application file for complete search history.

(56) References Cited

U.S. PATENT DOCUMENTS

| | | | | |
|---|---|---|---|---|
| 2010/0145560 A1* | 6/2010 | Komatsu | ............... | B60W 10/26 701/22 |
| 2010/0265050 A1* | 10/2010 | Skaff | .................... | B60K 6/448 340/438 |

(Continued)

FOREIGN PATENT DOCUMENTS

| | | |
|---|---|---|
| CN | 101863250 A | 10/2010 |
| JP | 2014-047637 A | 3/2014 |
| WO | 2011/030444 A1 | 3/2011 |

*Primary Examiner* — Aaron L Troost
(74) *Attorney, Agent, or Firm* — Oliff PLC

(57) ABSTRACT

A display device is mounted on a hybrid vehicle. The hybrid vehicle includes a driving mode controller configured to control switching between a first driving mode in which internal charging of an electricity storage device by a power generator is limited and a second driving mode in which internal charging of the electricity storage device by the power generator is controlled so that the residual capacity of the electricity storage device is maintained within a given control range. The display device includes a display for displaying information, and a display controller. The display controller displays information regarding start of an internal-combustion engine on the display when the internal-combustion engine is started in the first driving mode and does not display information regarding start of the internal-combustion engine on the display when the internal-combustion engine is started in the second driving mode.

2 Claims, 4 Drawing Sheets

(56) References Cited

U.S. PATENT DOCUMENTS

2011/0095878 A1\* 4/2011 Skaff .................. B60K 6/445
 340/441
2011/0295456 A1 12/2011 Yamamoto et al.
2015/0211468 A1 7/2015 Ezumi et al.

\* cited by examiner

DURING EV MODE

DISPLAY DEVICE

BACKGROUND

1. Technical Field

The present disclosure relates to a technique for displaying information regarding engine start of a hybrid vehicle.

2. Description of Related Art

Patent Document 1 discloses a technique related to a vehicle that automatically stops its engine when the vehicle stops and that automatically restarts the engine when a predetermined condition is satisfied after the automatic stop, and the reason for the automatic restart is displayed on the display of the vehicle.

[Patent Document 1] Japanese Unexamined Patent Application Publication No. 2014-47637

Also when the engine is started in a hybrid vehicle, by displaying the reason for the engine start, the user can find that the vehicle has not operated abnormally and may gain a sense of safety. However, if the reasons for engine start are frequently displayed, the user may feel annoyed therewith.

SUMMARY

The embodiments have been made in view of such a situation, and a purpose thereof is to provide a technique for notifying a user of information regarding start of an internal-combustion engine and also preventing the user feeling annoyed therewith.

To solve the problem above, a display device of one embodiment is mounted on a hybrid vehicle comprising an internal-combustion engine configured to generate vehicle drive power, an electric motor configured to generate the vehicle drive power, an electricity storage device configured to store electricity used to drive the electric motor, a power generator capable of generating electricity using drive power provided from the internal-combustion engine, and a driving mode controller configured to control switching between a first driving mode in which internal charging of the electricity storage device by the power generator is limited and a second driving mode in which internal charging of the electricity storage device by the power generator is controlled so that the residual capacity of the electricity storage device is maintained within a predetermined control range, and the display device comprises: a display configured to display information; and a display controller configured to display information regarding start of the internal-combustion engine on the display when the internal-combustion engine is started in the first driving mode and configured not to display information regarding start of the internal-combustion engine on the display when the internal-combustion engine is started in the second driving mode.

According to the embodiment, when the internal-combustion engine is started at unintended timing for the user in the first driving mode, the user can be certainly notified of information regarding start of the internal-combustion engine, while botheration of display in the second driving mode, in which the internal-combustion engine is started more frequently than in the first driving mode, can be prevented.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

Various embodiments will now be described by reference to the drawings. The embodiments are illustrative and are not intended to be limiting.

Figure 1:
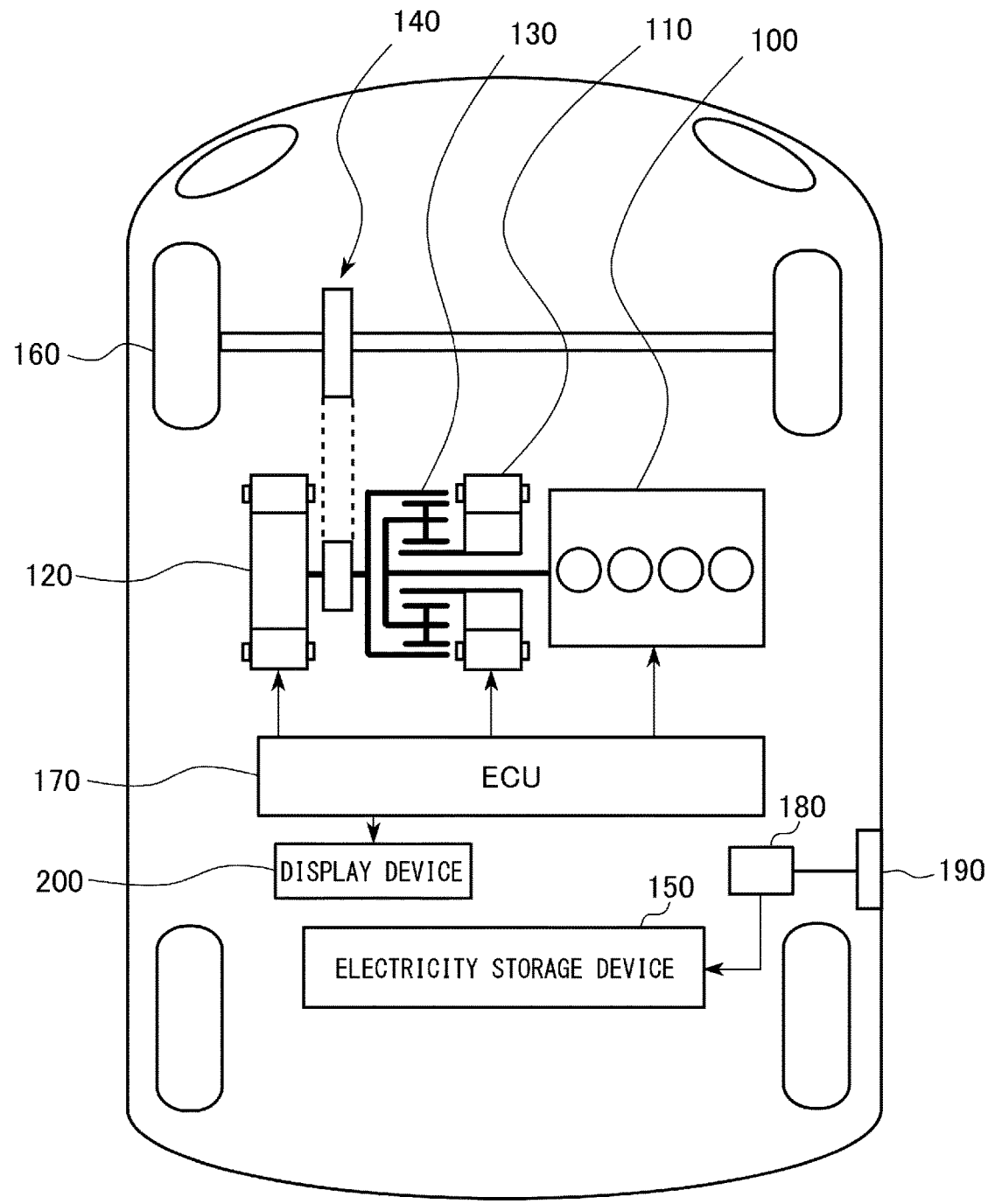
FIG. 1 is a block diagram that shows a schematic configuration of a hybrid vehicle 1 according to an embodiment.

FIG. 1 is a block diagram that shows a schematic configuration of a hybrid vehicle 1 according to an embodiment. The hybrid vehicle 1 comprises an engine (internal-combustion engine) 100, a first electric motor (power generator, MG: Motor-Generator) 110, a second electric motor 120, a power split device 130, a reducer 140, an electricity storage device 150, drive wheels 160, an electronic control unit (ECU) 170, a charger 180, a charge inlet 190, and a display device 200.

The engine 100, first electric motor 110, and second electric motor 120 are connected to the power split device 130. The hybrid vehicle 1 is driven by drive power provided from at least one of the engine 100 and the second electric motor 120. The drive power generated by the engine 100 is divided between two systems by the power split device 130: one is a system by which the drive power is transmitted to the drive wheels 160 via the reducer 140; and the other is a system by which the drive power is transmitted to the first electric motor 110.

The first electric motor 110 can generate electricity using the drive power provided from the engine 100 and divided by the power split device 130. More specifically, when the residual capacity {hereinafter, referred to as "state of charge (SOC)"} of the electricity storage device 150 is low, the engine 100 is started and the first electric motor 110 generates electricity. With the electricity generated by the first electric motor 110, the electricity storage device 150 is charged.

The second electric motor 120 generates drive power using at least one of the electricity stored in the electricity storage device 150 and the electricity generated by the first electric motor 110. The drive power generated by the second electric motor 120 is then transmitted to the drive wheels 160 via the reducer 140.

During braking of the vehicle, for example, the drive wheels 160 drive the second electric motor 120 via the reducer 140, so that the second electric motor 120 operates as a power generator. Namely, the second electric motor 120 operates as a regenerative braking system for converting braking energy into electricity. Accordingly, with the electricity generated by the second electric motor 120, the electricity storage device 150 is charged.

The electricity storage device 150 is a rechargeable DC power supply, including a nickel-metal hydride battery, a lithium-ion battery, and other secondary batteries. The electricity storage device 150 stores electricity used to drive the second electric motor 120. Besides the electricity generated by the first electric motor 110 and the second electric motor 120, electricity supplied from a power supply outside the vehicle (hereafter, referred to as an external power supply) is also stored in the electricity storage device 150, as will be described later. Charging an electricity storage device with an external power supply will be referred to as external charging. As the electricity storage device 150, a high-capacity capacitor may also be used.

The ECU 170 switches the driving mode between an Electric Vehicle (EV) mode (a first driving mode) and a Hybrid Vehicle (HV) mode (a second driving mode), based on the SOC of the electricity storage device 150. In the EV mode, the hybrid vehicle 1 is driven mainly by drive power from the second electric motor 120 when the SOC of the electricity storage device 150 is greater than a predetermined value. In the EV mode, the first electric motor 110 does not generate electricity using drive power from the engine 100, so that internal charging of the electricity storage device 150 is limited. Although the EV mode aims to improve the fuel consumption rate by maintaining the engine 100 in the stop state, the engine 100 may be started in a certain case, as will be described later.

In the HV mode, power generation performed by the first electric motor 110 is controlled so that the SOC of the electricity storage device 150 is maintained within a predetermined control range after the SOC is reduced to the predetermined value or less. For the power generation performed by the first electric motor 110, the engine 100 is started. As described previously, drive power generated by the engine 100 is also partly used for the traveling of the hybrid vehicle 1.

In the HV driving mode, a control device 2 determines target values of the rotational speed of the engine 100, the amount of electricity generated by the first electric motor 110, and the torque of the second electric motor 120 so as to optimize the overall fuel economy, based on a signal from each sensor, the traveling state, and the accelerator position, for example.

The target values are determined also in consideration of the SOC of the electricity storage device 150, and electricity stored in or discharged from the electricity storage device 150 is managed so that the SOC of the electricity storage device 150 is maintained within a predetermined control range with a predetermined control center value as the center. More specifically, since the difference between the electricity generated by the first electric motor 110 using part of drive power from the engine 100 and the electricity consumed by the second electric motor 120 to generate drive power corresponds to the electricity stored in or discharged from the electricity storage device 150, the amount of electricity generated by the first electric motor 110 and the amount of electricity consumed by the second electric motor 120 are determined according to the SOC of the electricity storage device 150. Further, since the electricity stored in or discharged from the electricity storage device 150 is also affected by the traveling state of the hybrid vehicle 1, the "predetermined control range" within which the SOC of the electricity storage device 150 is maintained is not necessarily clearly defined.

The ECU 170 controls operations of the engine 100, first electric motor 110, and second electric motor 120, according to the driving mode. The ECU 170 also performs display control of the display device 200, which will be described later. The ECU 170 may be divided into multiple ECUs for the respective functions.

Electricity supplied from an external power supply (not illustrated) is input to the charge inlet 190, and the charger 180 converts the voltage of the electricity into a predetermined charge voltage. The electricity of which the voltage is thus converted by the charger 180 is then supplied to the electricity storage device 150, which is charged accordingly. The charge inlet 190 is configured to be connectable with a charging cable connected to the external power supply and is a power interface for receiving electricity supplied from the external power supply.

The display device 200 is mounted within the vehicle cabin of the hybrid vehicle 1 and displays various pieces of information. The display device 200 may also have a car navigation function.

Figure 2:
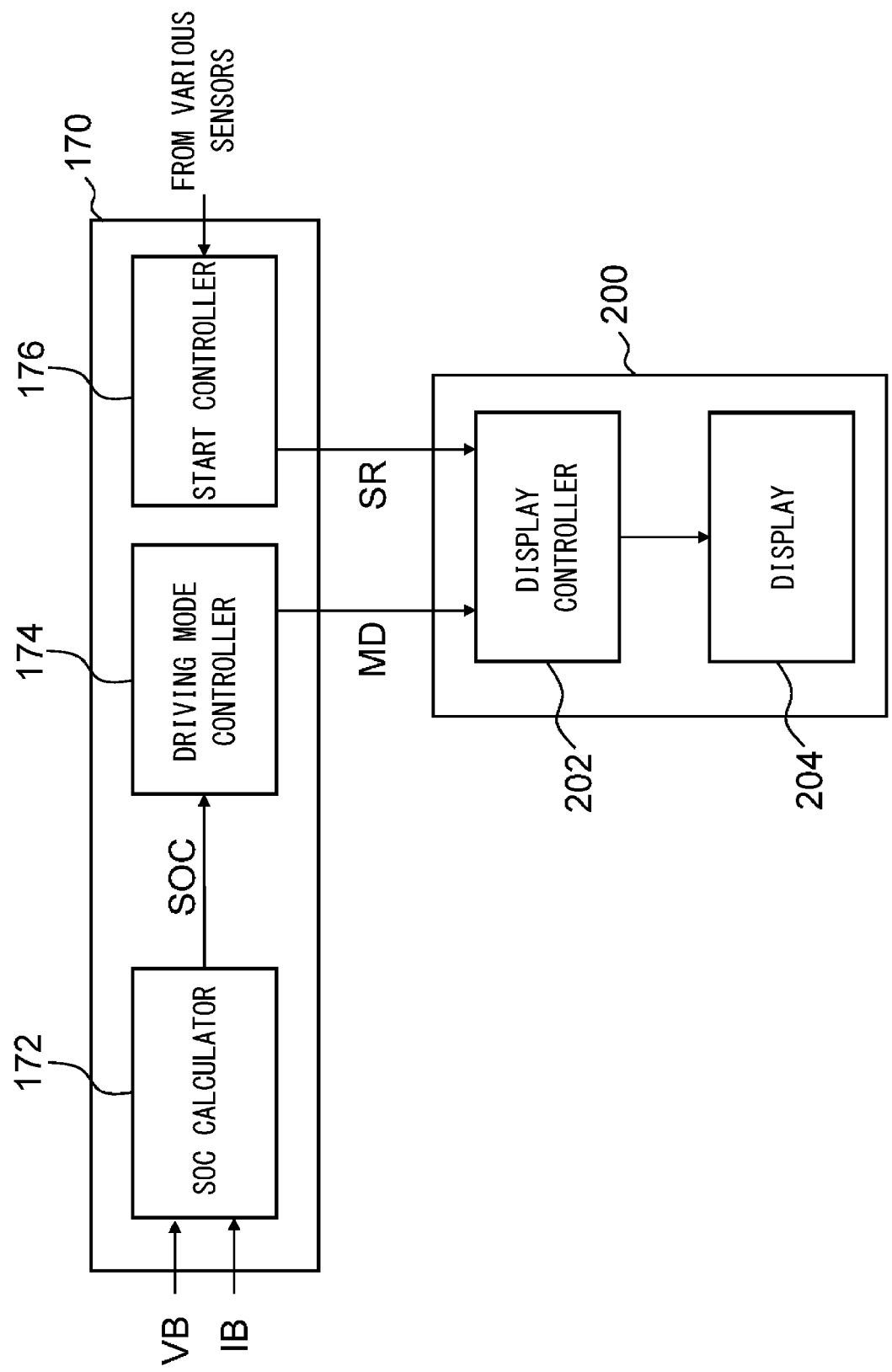
FIG. 2 is a block diagram that shows a part of an ECU relevant to control of display of a reason for engine start and a display device shown in FIG. 1.

FIG. 2 is a block diagram that shows a part of the ECU 170 relevant to control of display of a reason for start of the engine 100 (information regarding start) and the display device 200 shown in FIG. 1. The ECU 170 comprises an SOC calculator 172, a driving mode controller 174, and a start controller 176. The display device 200 comprises a display controller 202 and a display 204.

The SOC calculator 172 calculates the SOC of the electricity storage device 150 based on a voltage VB and a current IB output from the electricity storage device 150. For the method for calculating the SOC, various publicly-known methods can be employed. The voltage VB and current IB are detected by a voltage sensor and a current sensor, which are not illustrated.

The driving mode controller 174 switches the driving mode between the EV mode and the HV mode, based on the SOC calculated by the SOC calculator 172. More specifically, the driving mode controller 174 sets the driving mode to the EV mode when external charging is performed and the SOC exceeds a predetermined value, and the driving mode controller 174 maintains the EV mode until the SOC becomes the predetermined value or less. Once the SOC decreases to the predetermined value, the driving mode controller 174 switches the driving mode from the EV mode to the HV mode and maintains the HV mode until external charging is performed again. The driving mode controller 174 outputs a mode signal MD indicating a driving mode.

When a predetermined start condition is satisfied while the engine 100 is stopped in the EV mode and HV mode, the start controller 176 starts the engine 100. The start controller 176 judges that the start condition is satisfied based on signals supplied from various sensors, not illustrated, for example. The various sensors include a sensor for detecting the temperature of the electricity storage device 150, an accelerator position sensor, and a vehicle speed sensor, for example. When starting the engine 100, the start controller 176 outputs a start reason signal SR that indicates the reason for the start of the engine 100.

As start conditions and reasons for start, the following examples may be considered.

(1) If the start condition of "a predetermined amount or more of accelerator operation having been performed" is satisfied, the reason for the start will be "accelerator operation".

(2) If the start condition of "warming-up operation being needed" is satisfied, the reason for the start will be "warming up".

(3) If the start condition of "accelerator operation having been performed and the temperature of the electricity storage device 150 being a predetermined temperature or lower" is satisfied, the reason for the start will be "accelerator operation (low battery temperature)".

(4) If the start condition of "the speed exceeding a predetermined speed" is satisfied, the reason for the start will be "EV overspeed".

(5) If the start condition of "increased output of the air conditioner" is satisfied, the reason for the start will be "air conditioner requirement".

(6) If the start condition of "engine braking being needed" is satisfied, the reason for the start will be "engine braking".

(7) If the start condition of "other predetermined conditions" is satisfied, the reason for the start will be "system requirements".

When the start condition is not satisfied after the engine 100 is started, the start controller 176 stops the engine 100 and also stops outputting of the start reason signal SR.

Based on the mode signal MD output from the driving mode controller 174 and the start reason signal SR output from the start controller 176, the display controller 202 controls display of a reason for start of the engine 100 on the display 204. More specifically, when the engine 100 is started in the EV mode, the display controller 202 displays the reason for the start of the engine 100 on the display 204, and, when the engine 100 is started in the HV mode, the display controller 202 does not display the reason for the start of the engine 100 on the display 204.

When the engine 100 is stopped after a reason for start of the engine 100 is displayed on the display 204, the display controller 202 terminates the display of the reason for the start. The display controller 202 may also terminate the display of the reason for the start when a predetermined period of time elapses after the reason for the start of the engine 100 is displayed on the display 204, before the engine 100 is stopped.

The display controller 202 includes a computer, and each of various functions of the display controller 202 can be implemented by a circuit block, a memory, an LSI or the like in terms of hardware, and by a memory-loaded program or the like in terms of software. Accordingly, it will be obvious to those skilled in the art that the various functions of the display controller 202 may be implemented in a variety of forms by hardware only, software only, or a combination thereof, and the form is not limited to any of them.

The display 204 may include a liquid crystal panel, for example, and displays various pieces of information including a reason for start in the EV mode.

There will now be described the operations of the hybrid vehicle 1 and the display on the display 204.

After external charging is performed, the hybrid vehicle 1 is operated to start traveling. Thereafter, until the SOC of the electricity storage device 150 becomes a predetermined value or less, the hybrid vehicle 1 travels in the EV mode. In the EV mode, electricity supplied from an external power supply and stored in the electricity storage device 150 is actively used for the traveling, and the hybrid vehicle 1 travels with the engine 100 stopped unless greater drive power for traveling is required for rapid acceleration, hill-climbing, or the like. Even in the EV mode, the engine 100 is started when a start condition is satisfied, as stated previously.

Figure 3:
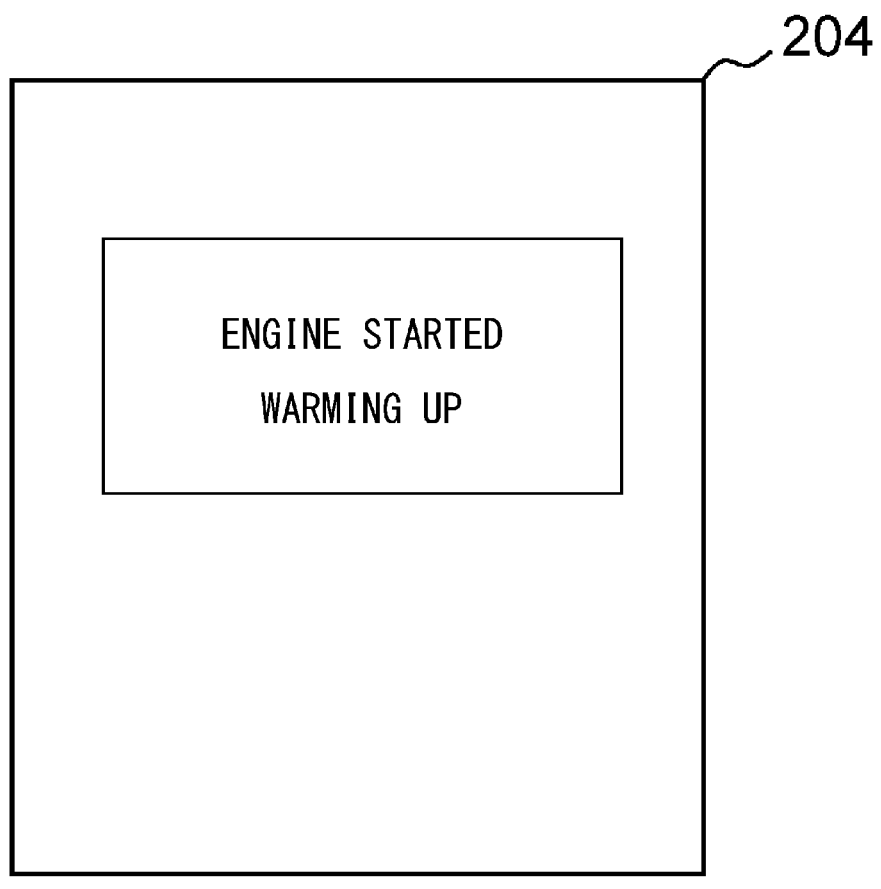
FIG. 3 is a diagram that shows a display state of a display shown in FIG. 2 in an EV mode.

FIG. 3 is a diagram that shows a display state of the display 204 shown in FIG. 2 in the EV mode. In the example of FIG. 3, the engine is started, and the display 204 displays the information of "engine started" and the reason for the start as "warming up".

Once the SOC of the electricity storage device 150 decreases to the predetermined value, the hybrid vehicle 1 starts to travel in the HV mode. Even in the HV mode, the second electric motor 120 could be operated, and the engine 100 could be stopped, as stated previously. In the HV mode, even when the engine 100 is started, the display 204 does not display the reason for the start of the engine 100.

Figure 4:
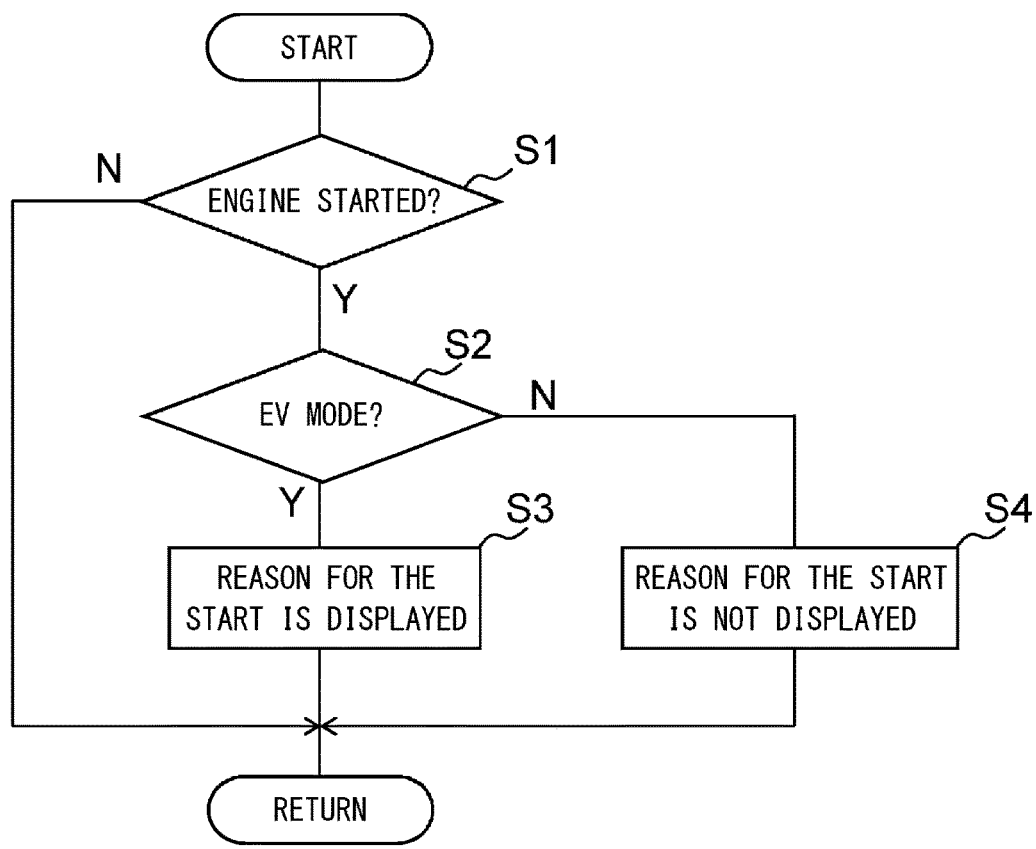
FIG. 4 is a flowchart that shows processing for controlling display of a reason for engine start according to an embodiment.

FIG. 4 is a flowchart that shows processing for controlling display of a reason for start of the engine 100 according to an embodiment. The processing shown in FIG. 4 is performed regularly with a predetermined period. The display controller 202 judges whether the engine 100 has been started based on the start reason signal SR (S1) and, if the engine 100 has not been started (N at S1), the display controller 202 will terminate the processing. If the engine 100 has been started (Y at S1), the display controller 202 will judge whether or not the driving mode is the EV mode based on the mode signal MD (S2). If the driving mode is the EV mode (Y at S2), the display controller 202 will display the reason for the start of the engine 100 on the display 204 (S3). If the driving mode is not the EV mode (N at S2), the display controller 202 will not display the reason for the start of the engine 100 on the display 204 (S4).

Thus, in the present embodiment, when the engine 100 is started in the EV mode, the reason for the start of the engine 100 is displayed on the display 204, and, when the engine 100 is started in the HV mode, the reason for the start of the engine 100 is not displayed on the display 204. Accordingly, when the engine 100 is started at unintended timing for the user in the EV mode, the user can be certainly notified of the reason for the start of the engine 100, while botheration of display in the HV mode, in which the engine 100 is started more frequently than in the EV mode, can be prevented. Therefore, in the EV mode, the user can be notified that the vehicle has not operated abnormally and can gain a sense of safety.

Thus, according to the present embodiment, a user can be notified of the reason for start of the engine 100 but is less likely to feel annoyed.

The hybrid vehicle 1 may be a hybrid vehicle of which the electricity storage device 150 cannot be charged using an external power supply and of which the driving mode can be temporarily switched to the EV mode according to a switch operation by a user. Also in this case, the effects of the aforementioned embodiment can be obtained. However, in the case of a plug-in hybrid vehicle of the aforementioned embodiment, the travelable distance in the EV mode is longer than that of a hybrid vehicle of which external charging is impossible, and a period of the EV mode is longer than a period of the HV mode in normal use. Accordingly, in the case of a plug-in hybrid vehicle of the aforementioned embodiment, since a period of the HV mode, in which the reason for start is not displayed, is shorter compared to the case of a hybrid vehicle of which external charging is impossible, the user's anxiety about the reason being not displayed can be reduced, while botheration of display in the HV mode can be removed.

Described above is an explanation based on exemplary embodiments. The embodiment is intended to be illustrative only, and it will be obvious to those skilled in the art that various modifications to a combination of constituting elements or processes could be developed and that such modifications also fall within the scope of the present disclosure.

What is claimed is:

1. A display device mounted on a hybrid vehicle comprising an internal-combustion engine configured to generate vehicle drive power, an electric motor configured to generate the vehicle drive power, an electricity storage device configured to store electricity used to drive the electric motor, a power generator capable of generating electricity using drive power provided from the internal-combustion engine, and a driving mode controller configured to control switching between an Electric Vehicle (EV) mode in which internal charging of the electricity storage device by the power generator is limited and the internal-combustion engine may be started when at least one predetermined condition is satisfied and a Hybrid Vehicle (HV) mode in which internal charging of the electricity storage device by the power generator is controlled so that the residual capacity of the electricity storage device is maintained within a predetermined control range and the internal-combustion engine may be started when the at least one predetermined condition is satisfied, the display device comprising:

a display configured to display information in both of the EV mode and the HV mode, wherein in the EV mode the display information includes a reason for starting the internal-combustion engine associated with each at least one predetermined condition, and in the HV mode the display information does not include the reason for starting the engine associated with each at least one predetermined condition; and a display controller configured to display the reason for starting the internal-combustion engine on the display when the internal-combustion engine is started in the EV mode, and configured not to display the reason for starting the internal-combustion engine on the display when the internal-combustion engine is started in the HV mode, wherein in the HV mode, the internal-combustion engine starts and stops repeatedly, and more frequently than in the EV mode.

2. The display device of claim 1, wherein the reason for starting is engine braking or low battery temperature.

\* \* \* \* \*